United States Patent [19]
Myers

[11] 3,866,727
[45] Feb. 18, 1975

[54] FLUID OPERATED CLUTCH AND BRAKE WITH DASHPOT

[75] Inventor: Gerald L. Myers, Toledo, Ohio

[73] Assignee: Dana Corporation, Toledo, Ohio

[22] Filed: Jan. 18, 1974

[21] Appl. No.: 434,532

[52] U.S. Cl............ 192/13 R, 192/109 D, 92/13.1, 92/143
[51] Int. Cl............................................. F16d 67/04
[58] Field of Search.. 192/13 R, 18 A, 12 C, 109 D; 92/13.1, 13.6, 143, 85

[56] References Cited
UNITED STATES PATENTS
| | | | |
|---|---|---|---|
| 2,836,270 | 5/1958 | Leopold | 192/12 C |
| 3,743,070 | 7/1973 | Howard et al. | 192/18 A |
| 3,805,669 | 4/1974 | Mitchell | 92/13.1 |

Primary Examiner—Benjamin W. Wyche
Attorney, Agent, or Firm—Robert E. Pollock

[57] ABSTRACT

A clutch and operating means therefor are disclosed. The clutch includes a brake and the operating means comprises a multiple piston cylinder arrangement. One piston is operatively connected to both the clutch collar and the brake. A first part of the travel of the first piston effects disengagement of the clutch and travel beyond this point effects engagement of the brake. The travel of the first piston is limited, when braking is not desired, by a second piston working in opposition to the first. A third piston is arranged to provide a controlled release rate of the first piston and slow re-engagement of the clutch.

7 Claims, 6 Drawing Figures

FLUID OPERATED CLUTCH AND BRAKE WITH DASHPOT

BACKGROUND OF THE INVENTION

Clutches with integral brakes are well known in the art for use with transmissions which do not include synchronization means. The brake is used when upshifting to a higher gear in order to slow the clutch output shaft to the appropriate speed for initial operation in the higher gear.

It is common practice to utilize a single operator for both the disengagement of the clutch and, upon further travel the engagement of the clutch brake. Such an arrangement is shown, for example, in U.S. Pat. No. 3,763,977 which issued to Howard Sink. Various multiple piston actuators are known in the art and are shown, for instance, in U.S. Pat. Nos. 787,480 and 3,371,582. Operation of clutches and shifting of mechanical transmissions by multiple piston actuators is generally known and shown, for instance in U.S. Pat. Nos. 2,317,216 and 2,944,435.

Such known prior art devices do not, however, provide a simple means for remote actuation of a clutch and, selectively, its asssociated brake. Such a device is of particular importance in the provision of an automatic or semi-automatic mechanical (as opposed to conventional automatic) transmission.

Accordingly, it is an object of the present invention to provide a clutch and brake with a simple actuator adapted for simple use with an automatic mechanical tranmission.

It is another object of the present invention to provide such a clutch, brake and actuataor combination which allows for simple selective actuation of the brake.

It is a further object of the invention to provide such a device wherein re-engagement of the clutch is controlled.

SUMMARY OF THE INVENTION

These and other objects are provided by a clutch and brake combination including a multiple piston actuator. A first piston is operably connected to both the clutch and brake. Stroking of this piston in one direction initially disengages the clutch and subsequently engages the brake. A second piston, preferably a free piston, is arranged such that in a first position it allows full travel of the first piston and, in a second position, allows travel of the first piston far enough to disengage the clutch but not far enough to engage the brake. A third piston, preferably carried within the first piston, is arranged to allow rapid initial reengagement of the clutch and to retard travel of the clutch to its final fully engaged position.

BRIEF DESCRIPTION OF THE DRAWINGS

Although the specification concludes with claims particularly pointing out and distinctly claiming what is regarded as the invention, the same will be better understood with reference to the following description taken in conjunction with the accompanying drawings in which:

DESCRIPTION OF THE PREFERRED EMBODIMENTS

Figure 1:
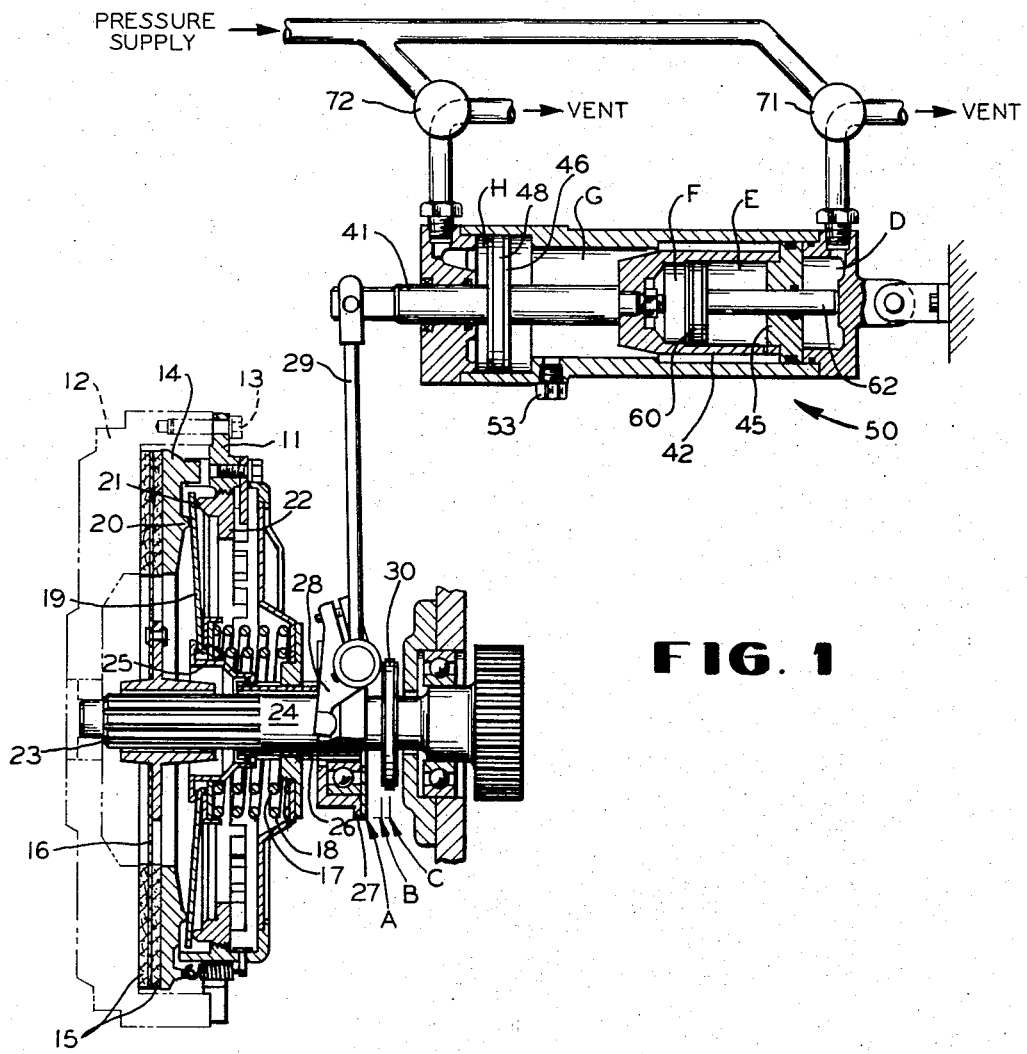
FIG. 1 is a partially sectioned elevational view of a preferred clutch-brake-actuator assembly; and, FIG. 2 – 6 are additional views of the actuator of FIG. 1 showing the position of its elements at various conditions of operation.

Turning now to the drawings, FIG. 1 is a partially sectioned vertical view of a preferred embodiment of the present invention. The clutch is of a generally conventional design and includes a cover 11 adapted for connection to the flywheel 12 of an internal combustion engine, not shown, via bolts 13. Pressure plate 14 is biased against clutch plates 15 and driven member 16 by springs 17 and 18 acting via links 19. A pivot 20 is provided on pressure plate 14 and a pivot 21 is provided on adjusting ring 22 to serve as reaction points for link 19. Driven member 16 is mounted on splines 23 on output shaft 24 for rotational movement therewith and axial movement therealong. Collar 25 is mounted on sleeve 26 which is concentrically disposed about shaft 24. Throw-out bearing 27 is also mounted on shaft 24 and, when clutch disengagement is desired, is pulled rearwardly (away from the engine) by movement of the shift fingers 28 and shift arm 29. Movement of the throwout bearing from its normal position A to position B pulls the sleeve 26 and collar rearwardly against the biasing of springs 17 and 18 a distance sufficient to relieve substantially all of the force between the pressure plate 14 and the clutch plates 15; i.e., to disengage the clutch. Travel beyond point B and to point C puts the throw-out bearing in operative contact with the brake 30.

Shift arm 29 is connected to the cylinder and piston operating arrangement which comprises the essential improvement of the present invention. Rod 41 is attached to a first piston 42 by any suitable means such as nut 43 and operates, via arm 29 the aforedescribed clutch and brake. Seals 44 are associated with said first piston 42 and, in a preferred embodiment, are carried on the plate 45 which forms one wall of a chamber within first piston 42.

A second piston 46 is mounted in opposition to the first piston 42 and is arranged to be shiftable between first and second positions. When in the first position, the second piston allows full travel of the first piston; i.e., allows travel far enough to disengage the clutch and to engage the brake. When in the second position, the second piston limits the travel of the first piston, allowing it to disengage the clutch but not engage the brake. In a preferred embodiment, and as shown most clearly in FIG. 2 the second piston 46 is "free" and is slidably and concentrically mounted on rod 41 and sealed thereabout by seals 47. Also carried by free piston 46 are seals 48 which seal to the adjacent wall of the cylinder which is designated generally by the numeral 50. In the preferred configuration the bore 51 and free piston 46 are large in diameter than the effective diameter of the first piston 42 and the bore 52 in which it slides for reasons which will hereinafter be described.

Also associated with the first piston 42 is a third piston which is arranged so as to inhibit the retraction of the first piston 42 so as to effect re-engagement of the clutch at a controlled rate. In the preferred embodiment of the third piston 60 is received in an interior bore 61 in the first cylinder 42. A rod 62 is attached to the piston 60 and extends through and is slidingly sealed to plate 45 by seals 63. A passageway 64 extends through the rod 62 and communicates with a restricted passageway 65. A free passageway 66 is provided through the wall of piston 42. Cylinder 50 is also vented to atmosphere through a filter 53 or other suitable means.

Figure 2:
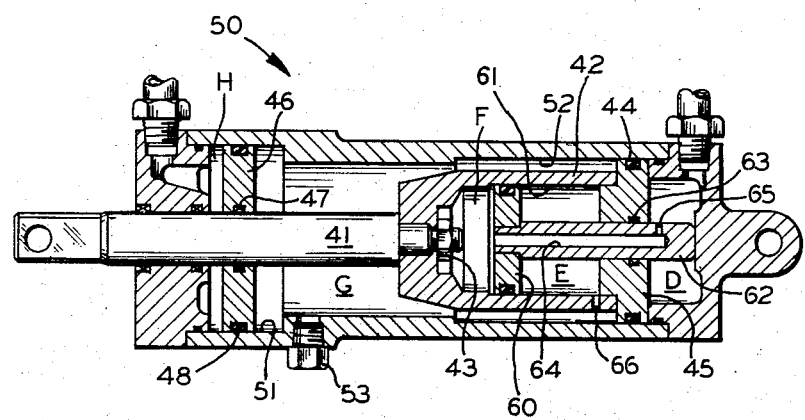
Figure 3:
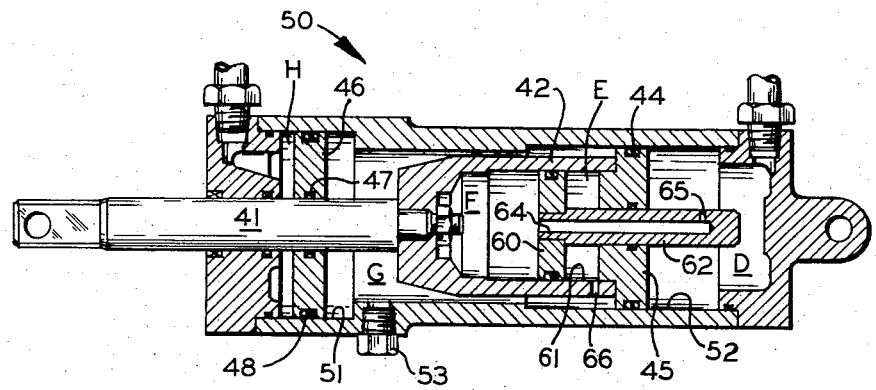
Figure 4:
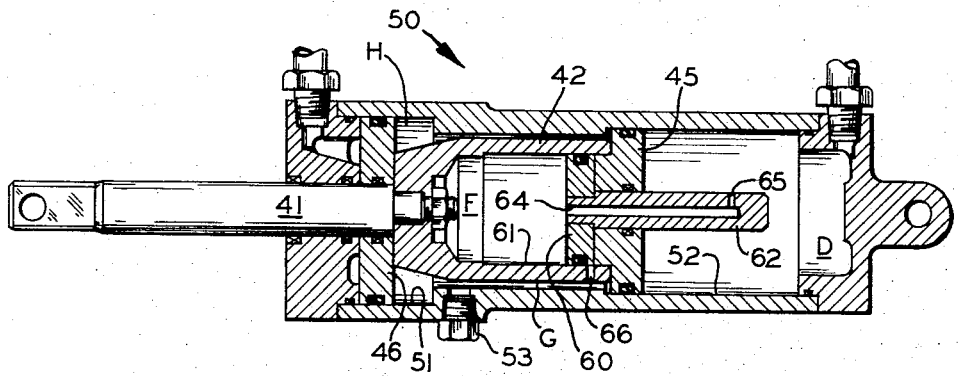

Referring again to FIG. 1, the three-piston cylinder arrangement of the present invention is operated simply by a single source of pneumatic or hydraulic pressure and two three-way valves 71 and 72 are positioned to supply pressure to or vent the cylinder 50 (which will normally occur when they are de-energized). The pistons are located as shown in FIG. 2 with no pressure applied. The first piston 42 is forced to the right by the action of the clutch springs 17 and 18 and the third piston 60 is carried by and in the direction of the first piston 42 to the position shown. The second piston 46 is free and will typically assume a position intermediate the extremes of its travel.

For convenience in describing the action of the pistons at various points in operation the various chambers within the cylinder are designated by letters D – H as shown in FIGS. 2 – 6.

When shifting is desired solenoid valve 71 is energized and chamber D is pressurized. In response to this pressurization, the first piston 42 moves quickly through the position shown in FIG. 3 to that shown in FIG. 4, pushing the second piston 46 along with it. The third piston 60 moves slowly to the right with respect to the first piston (see FIG. 3) as air or hydraulic fluid bleeds through the restricted passageway 65 and passageway 64 into Chamber F. Chamber E vents via passageway 66 into Chamber G which is maintained at atmospheric pressure as a result of vent 53.

Figure 5:
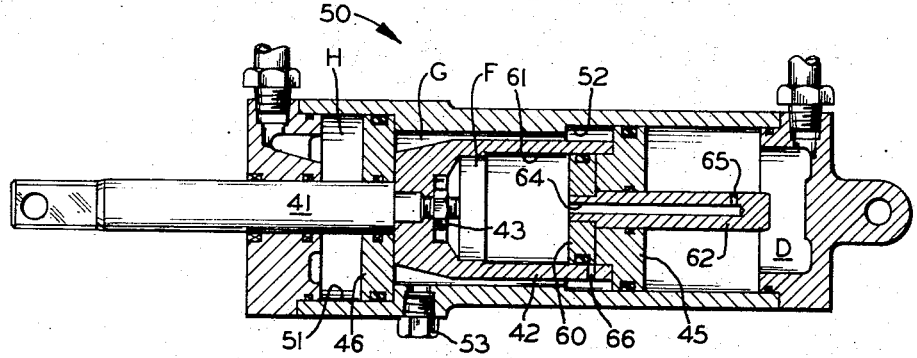

When engagement of brake 30 is not desired, as in downshifting, solenoid valve 72 is energized and Chamber H is pressurized, moving the second piston 46 to the extreme of its rightwardly travel as shown in FIG. 5. Piston 46 limits the travel of first piston 42, because of the relative sizes thereof, even though the pressures exerted on both pistons are identical. Of course, different pressures can be used to avoid the need for pistons of differing size but such an arrangement is generally more difficult and less desirable in practice than that shown.

Figure 6:
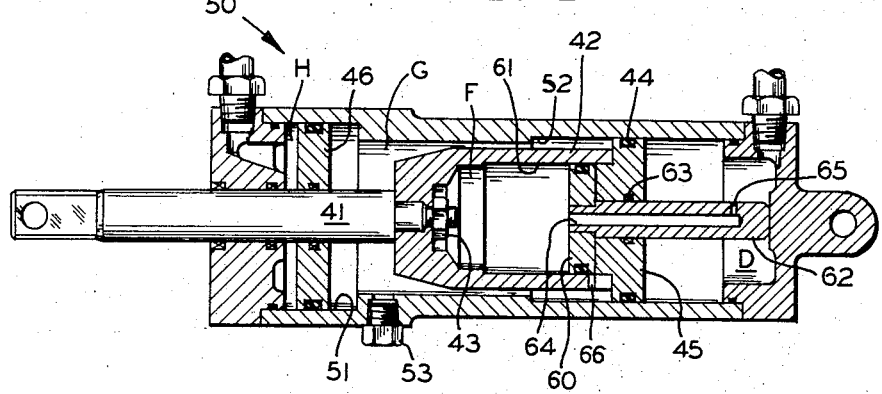

Upon de-energization of solenoid valve 71 pressure is vented from Chamber D and first piston 42 moves rapidly to the position shown in FIG. 6 whereupon the end of rod 62 abuts the end of cylinder 50. Further travel of piston 42 is retarded by the third piston 60 and rod 62 as a consequence of the need to vent Chamber F via passageway 64 and restriction 65. As Chamber F vents piston 42 moves slowly to the right, as shown, to the position shown in FIG. 2.

By proper selection of the relative sizes of the various elements comprising the cylinder and three piston operating members the clutch operation can be "programmed" to provide any desired rate, force and amount of travel in the clutch disengaging direction and two steps of rate and distance of travel in the clutch engagement direction.

Having described the invention with reference to a preferred embodiment, many variations will occur to those skilled in the art and within the spirit and scope of the following claims.

What is claimed is:

1. In a clutch including an input, an output, a brake, a shift means having first, second and third positions and wherein said input and output are connected when said shift means is in said first position and disconnected when said shift means is in said second and third positions and wherein said brake is actuated when said shift means is in said third position and an actuating means associated with said shift means the improvement wherein said actuating means comprises a cylinder having first, second and third pistons therein, said first piston being operatively connected to said shift means, said second piston being shiftable between a first position allowing travel of said first piston to said third position thereof, and a second position, limiting travel of said first position to said second position thereof, said third piston being adapted to allow free travel of said first piston from said first to said second and third positions thereof and to inhibit travel of said first piston from said second and third positions thereof.

2. The clutch of claim 1 wherein a rod operatively connects said first piston to said shift means and said second piston is slidably and concentrically mounted on said rod.

3. The clutch of claim 2 wherein said second piston has a greater diameter than said first piston.

4. The clutch of claim 1 wherein said first piston includes walls defining a chamber therein and said third piston is carried within said chamber.

5. The clutch of claim 4 wherein a rod operatively connects said first piston to said shift means and said second piston is slidably and concentrically mounted on said rod.

6. The clutch of claim 5, wherein said second piston has a greater diameter than said first piston.

7. The clutch of claim 6 including a single source of pressure for biasing said pistons, a first valve for selectively admitting pressure to said first piston for biasing said piston away from said first position thereof and a second valve for selectively admitting pressure to said second piston for biasing said piston away from said first position thereof.

* * * * *